(12) United States Patent
Kondo et al.

(10) Patent No.: US 6,741,652 B1
(45) Date of Patent: *May 25, 2004

(54) MOVEMENT VECTOR DETECTING DEVICE

(75) Inventors: Toshiaki Kondo, Fujisawa (JP); Masayoshi Sekine, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/380,140

(22) Filed: Jan. 27, 1995

Related U.S. Application Data

(63) Continuation of application No. 08/018,514, filed on Feb. 17, 1993, now abandoned.

(30) Foreign Application Priority Data

Feb. 21, 1992 (JP) ................................................ 4-034596

(51) Int. Cl.[7] ................................................ H04N 7/12
(52) U.S. Cl. ................................ 375/240.24; 348/208.4
(58) Field of Search ................................ 348/402, 413, 348/416, 699, 384, 390, 403–407, 420, 155, 207.99, 208.99, 208.1, 208.4; 382/232, 236, 238, 190, 266; 375/240.01, 240.08, 240.12, 240.16, 240.24; H04N 7/137, 7/12

(56) References Cited

U.S. PATENT DOCUMENTS 3,890,462 A * 6/1975 Limb et al. .................. 348/155
5,126,841 A * 6/1992 Tanaka et al. ............... 350/136
5,189,513 A * 2/1993 Sekine et al. ................ 358/105
5,220,508 A * 6/1993 Ninomiya et al. ........... 364/449

FOREIGN PATENT DOCUMENTS

| EP | 0454442 | 10/1991 |
| EP | 0557095 | 8/1996 |
| JP | 4-10176 | 1/1992 |

OTHER PUBLICATIONS

Gonzalez, Rafael and Woods, Richard E., *Digital Image Processing*, 1992, pp 416–418.*

"An Edge Detection Approach to Digital Image Stabilization Based on Tri–State Adaptive Linear Neurons" by Joon Ki Paik et al; IEE Transactions on Consumer Electronics, vol. 37, No. 3, Aug. 1991, New York US. pp. 521–529.

"Automatic Image Stabilizing System by Full–Digital Signal Processing" by Kenya Uomori et al.; IEEE Transactions on Consumer Electronics 36 (1990) Aug., No. 3, N.Y. USA pp. 510–519.

"Real Time Motion Vector Measurement Hardware" by S.C. Dabner; Proceedings of the Third International Workshop on HDTV Turin, Italy, Aug. 30th –Sep. 1st, 1989; pp. 117–123.

\* cited by examiner

*Primary Examiner*—Richard Lee
(74) *Attorney, Agent, or Firm*—Fitzpatrick, Cella, Harper & Scinto

(57) ABSTRACT

A movement vector detecting device is provided with a movement vector detecting circuit for detecting a movement vector in each of blocks obtained by dividing an image frame, an edge number detecting circuit for detecting the number of edges in each of the blocks, and an evaluation circuit for evaluating the reliability of the movement vector value detected by the movement vector detecting circiut, based on the number of edges detected by the edge number detecting circuit.

36 Claims, 5 Drawing Sheets

TEN PIXELS

TEN PIXELS

NUMBER OF EDGES IN x DIRECTION

A TOTAL OF TEN PIXEL

NUMBER OF EDGES IN y DIRECTION

A TOTAL OF NINE PIXELS

MOVEMENT VECTOR DETECTING DEVICE

This application is a continuation of application Ser. No. 08/018,514 filed Feb. 17, 1993, now abandoned.

BACKGROUND OF THE INVENTION

1. Field of the Invention

The present invention relates to a movement vector detecting device, and more particularly to a device for detecting a movement vector from an image signal.

2. Related Background Art

The movement vector detecting device has been employed in the image encoding device or the image vibration compensating device. For movement vector detection by image signal processing, there have been known a time-space inclination method disclosed for example in the U.S. Pat. No. 3,890,462 and in the Japanese Patent Publication No. 60-46878, a correlation method based on calculation of correlation, and a block matching method.

In the time-space inclination method, the amount of movement is calculated from the difference d in luminance between frames (or fields) and the difference Δ between pixels in a frame. There is utilized a property that the image signal of a moving image is an average in time with a field cycle time, and that the edge becomes less sharp and the difference Δ in luminance among pixels becomes smaller as the amount of movement of image becomes larger. The amount of movement is defined by d/Δ, namely the difference d in luminance among frames or fields, normalized by the difference Δ in luminance among pixels. The details of the time-space inclination method are described by B. K. P. Horn et al., Artificial Intelligence 17, p.185–203 (1981).

The block matching method consists of dividing the input image signal into blocks of a suitable size (for example 8 pixels by 8 lines), comparing each block with the pixels of a predetermined area in a preceding frame (or field) and determining the most resembling position by laterally moving the comparing position within the image frame. For example there is searched a position where the sum, within the block, of absolute difference of pixels between the frames (or fields), and the movement vector is represented by the relative displacement of the most resembling blocks. The details of the block matching calculation are reported by M. Ogami et al., Information Processing, Vol. 17, No. 7, p.634–640 July, 1976.

In these methods, however, it has been difficult to exactly detect the movement vector, or the detected movement vector has not been reliable, in case the unit block for movement vector detection contains only low spatial frequencies and lacks characteristic pattern (such as sky, water surface, white wall or asphalt surface), or in case said unit block contains a plurality of similar characteristic points with a high spatial frequency (such as flower field, leaves of a tree or a door with grid pattern), or in case an object having the edge only in a specified direction (such as an oblong rod) moves along the direction of said edge.

If a high-efficiency image encoding device or an image vibration compensating device is operated according to an erroneous movement vector or a movement vector involving a large error, the precision of encoding or compensation is significantly deteriorated, and the image quality may become even worse by such encoding or compensation.

In the field of vibration detection and vibration compensation utilizing the movement vector, the present applicant already has following patent applications and patents:

U.S. patent application Ser. Nos. 07/925,247, 07/935,633, 07/896,783, 07/852,494, 07/967,569, 07/691,784, 07/983,277, 07/799,053 and 07/798,946;

U.S. patent application Ser. No. 07/880,512 filed Jun. 30, 1986 and Ser. No. 07/425,477 filed Oct. 23, 1989; and U.S. Pat. Nos. 5,012,270 and 5,107,293.

SUMMARY OF THE INVENTION

The present invention is to resolve the above-mentioned drawbacks of the prior art, and a first object thereof is to provide a movement vector detecting device capable of exactly detecting the movement regardless of the state of the image.

A second object of the present invention is to provide a vibration compensating device capable of exactly detecting the movement vector of an object image regardless of the pattern thereof, and enabling to realize optimum movement compensating characteristics without erroneous operations.

A third object of the present invention is to provide a camera constantly capable of exact compensation for vibration regardless of the state of the object to be photographed.

The above-mentioned objects can be attained, according to a preferred embodiment of the present invention, by a movement vector detecting device comprising movement vector detecting means for dividing the image frame into plural blocks and detecting the movement vector in each block; edge detecting means for detecting the number of edges of the image in each block; and evaluation means for evaluating the reliability of the movement vector value detected by said movement vector detecting means, based on the number of edges detected by said edge detecting means.

Also according to another aspect of the present invention, there is disclosed a vibration compensating device comprising movement vector detecting means for dividing the image frame into plural blocks and detecting the movement vector in each block; edge detecting means for detecting the number of edges of the image in each of said blocks; calculation means for varying the weight on the movement vector value detected by said movement vector detecting means, based on the number of edges detected by said edge detecting means, thereby calculating the movement vector evaluation value of the image, and compensation means for compensating the image movement based on the output of said calculation means.

As the detected movement vector values of low reliability, based on the number of edges, are evaluated lightly or are excluded, it is rendered possible to obtain the exact movement vector values of high reliability in appropriate areas, and to constantly effect optimum detection of vibration.

Still other objects of the present invention, and the features thereof, will become fully apparent from the following description to be taken in conjunction with the attached drawings.

DETAILED DESCRIPTION OF THE PREFERRED EMBODIMENTS

Now the present invention will be clarified in detail by an embodiment thereof shown in the attached drawings.

Figure 1:
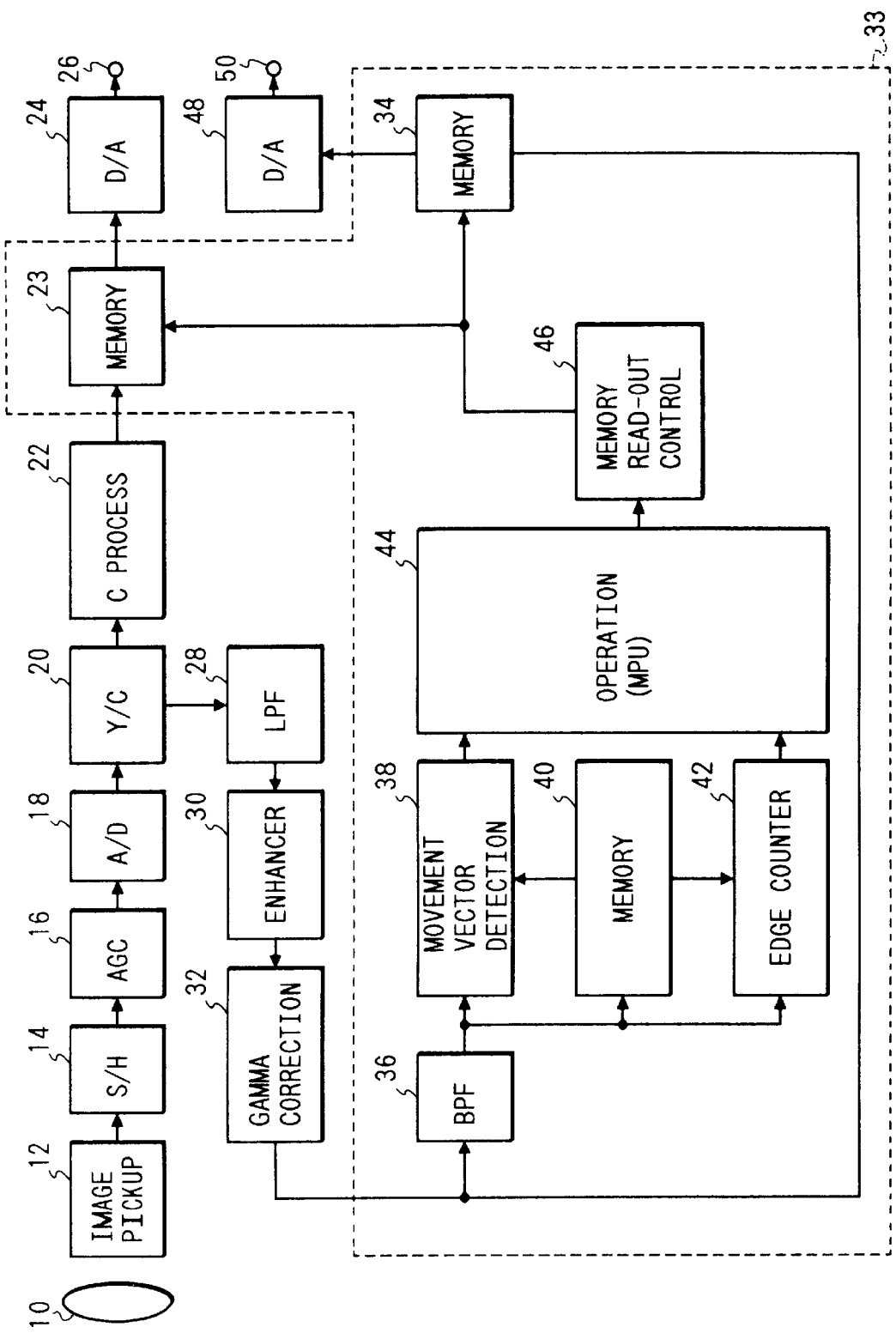
FIG. 1 is a block diagram of an embodiment of the present invention.

FIG. 1 is a block diagram of a video camera with an antivibration device, constituting an embodiment of the present invention. In this embodiment, the vibration of image is suppressed by storing the taken photo image signal of an image frame in an image memory, and controlling the read-out range from said image memory according to the detected movement vector.

In FIG. 1, an image pickup device 12 converts an object image, formed by a photo-taking lens 10, into an electrical signal. In the present embodiment, the image pickup device 12 releases a line-sequential color difference image signal. The output of said image pickup device 12 is supplied, through a sample hold (S/H) circuit 14, to an AGC (automatic gain control) circuit 16. Which automatically regulates the gain of the output signal of the S/H circuit 14, the output of which is converted into a digital signal by an A/D converting circuit 18.

A Y/C separation circuit 20 is composed of two 1H delay lines and an adder for adding the input and a 2H delayed signal. The output of said adder is supplied to a C process circuit 22 constituting a color signal processing circuit, while a 1H delayed signal is supplied to a low-pass filter (LPF) 28 of a luminance signal processing system. The C process circuit 22 generates a chroma signal from the output of the Y/C separation circuit 20, and its output is temporarily stored in a memory 23 in an image vibration suppressing circuit 33 to be explained later.

In the luminance signal processing system, the LPF 28 eliminates the carrier component of the line-sequential color difference signal, from the signal supplied from the Y/C separation circuit 20. The output of the LPF 28 is supplied to an enhancer 30 for edge enhancement. The enhancer 30 normally adds, to the input signal, a secondary differentiated signal thereof. A gamma correction circuit 32 avoids the saturation in the high-light area and widens the dynamic range, of the output of the enhancer 30. The ordinary luminance signal process is completed in this manner, and the output of the gamma correction circuit is supplied to the image vibration suppressing circuit 33.

In said image vibration suppressing circuit 33, the output of the gamma correction circuit 32 is supplied to a field (or frame) memory 34 and a band-pass filter (BPF) 36 consisting of a spatial frequency filter. A memory 34 temporarily stores the entered luminance signal. The BPF 36 extracts, from the output of the gamma correction circuit 32, spatial frequency components useful for movement vector detection. Thus the low and high spatial frequency components are eliminated from the image signal.

In the present invention, the BPF 36 releases the code bit of the digital output signal of the gamma correction circuit 32. This corresponds to the binarization of the luminance signal, employing the DC level as the threshold value. Thus, the circuits succeeding to the BPF 36 can be composed of 1-bit processing system and can therefore be more compact.

The output of the BPF is supplied to a movement vector detecting circuit 38, a memory 40 serving as 1-field time delay means and an edge counter 42. Said movement vector detecting circuit 38 also receives the signal of the preceding field from the memory 40, and detects the movement vector by the calculation according to the time-space inclination method or by the correlation calculation, based on the current field and the preceding field.

The edge counter 42 counts the number of edges in the horizontal and vertical directions contained in each unit block for movement vector detection in the movement vector detecting circuit 38. More specifically, it detects the inversion of output of the BPF 36, by taking exclusive logic sum between the neighboring pixels.

The movement vector (horizontal and vertical components) detected by the movement vector detecting circuit 38, and the number of edges in each block, detected by the edge counter 42, are supplied to an operation circuit 44 composed of a microcomputer, which evaluates the reliability of the movement vector in each block, by the number of edges in the same block. More specifically, the movement vectors respectively detected in the blocks constituting the detection units for the movement vector are weighted by the number of detected edges, and the movement vector for the entire image frame is detected, as will be explained later in more detail.

The operation circuit 44 supplies the calculated movement vector to a memory read-out control circuit 46, which, in response, controls read-out control circuit 46, which, in response, controls the read-out positions of the memories 23, 34 so as to cancel the image movement.

The chroma signal read from the memory 23 is converted into an analog signal by a D/A converter 24, and is released from an output terminal 26. Also the luminance signal read from the memory 34 is converted into an analog signal by a D/A converter 48, and is released from an output terminal 50. In this manner, the image signal with suppressed image vibration is released from said output terminals 26, 50.

Figure 2:
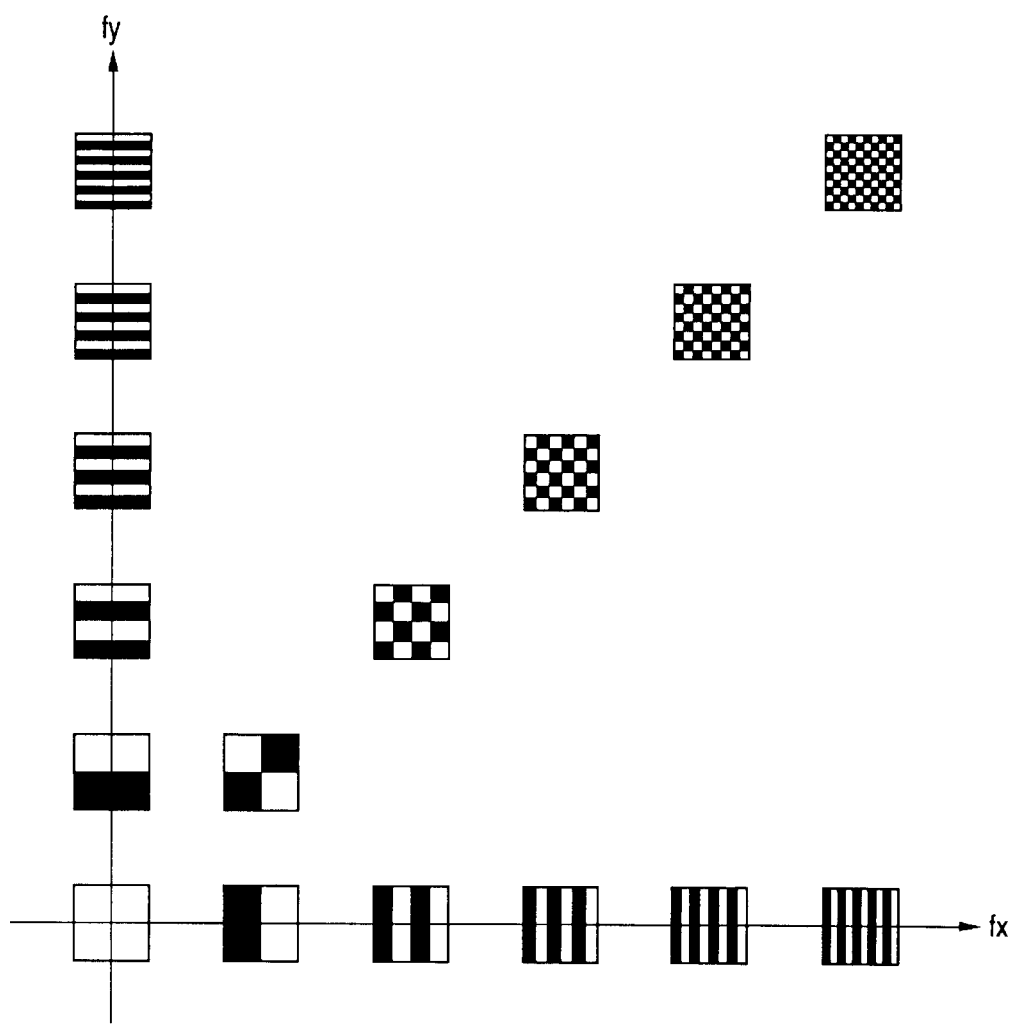
FIG. 2 is a view showing the relation between the spatial frequency and binary patterns.

In the following there will be given a detailed explanation on the calculation in the operation circuit 44, namely the evaluation of reliability of the movement vector, with reference to FIGS. 2, 3A, 3B and 4. FIG. 2 shows an orthogonal coordinate system representing the spatial frequency area, wherein the abscissa fx indicates the horizontal spatial frequency while the ordinate indicates the vertical spatial frequency. Pattern shown on the coordinate system indicates a binary pattern corresponding to the spatial frequency of the illustrated position. In general, the spatial frequency distribution of an image assumes a cross-shape pattern with limited diagonal components.

In the movement vector in general, the component of movement in a direction orthogonal to the direction of edge (tangential direction) of the image can be detected with satisfactory precision, but the component in the direction of edge is difficult to detect, with low reliability of detected value. Also in the direction orthogonal to the edge, the reliability becomes low if the periodical pattern exists in said direction, because of the possibility of mismatching.

Figure 3A:
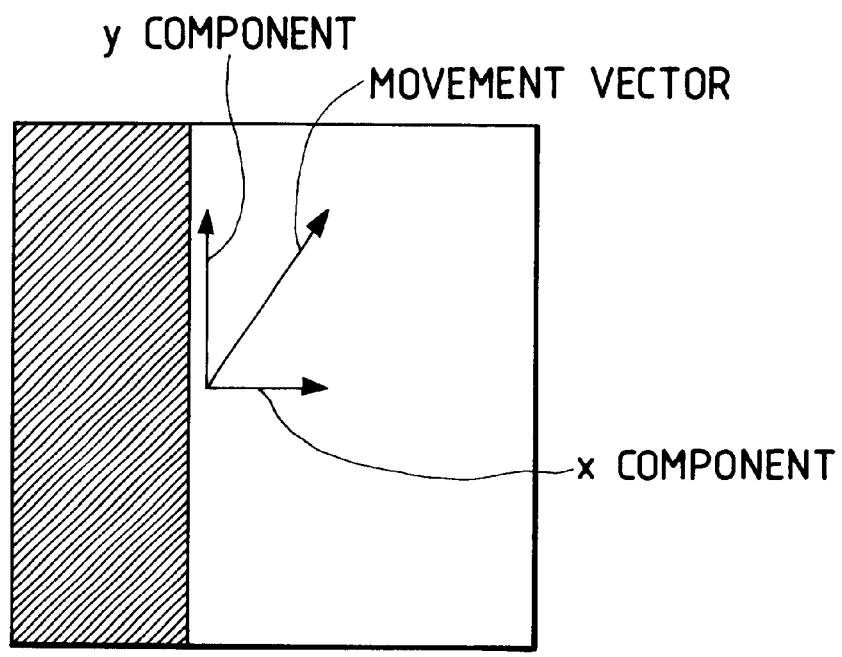
FIGS. 3A and 3B are views for explaining binary patterns.

For example, in case of an edge extending in the vertical (y) direction, the x component of the movement vector is detectable, but y component is not detectable. In case of a pattern as shown in FIG. 3A, with a block size of 10×10 pixels, there are observed 10 edges in the x-direction and 0 edges in the y-direction. In such case, the detected value of y-component of the movement vector is unreliable.

Figure 3B:
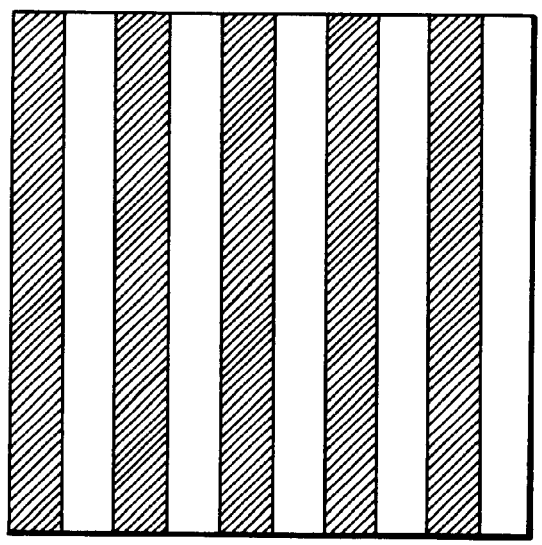

Also in case of a pattern shown in FIG. 3B, with a higher spatial frequency with periodicity in the x-direction, the detected value in the y-direction is unreliable because there is no edge in the y-direction as in the case of FIG. 3A. The reliability becomes also low in the x-direction, because of the possible mismatching resulting from the periodicity. If a block size of 10×10 pixels is employed for the pattern of FIG. 3B, there are obtained 90 (=9×10) edges in the x-direction and 0 edge in the y-direction. The detected value in the x-direction is unreliable because of too many edges, and the detected value in the y-direction is also unreliable because of absence of an edge.

Figure 4:
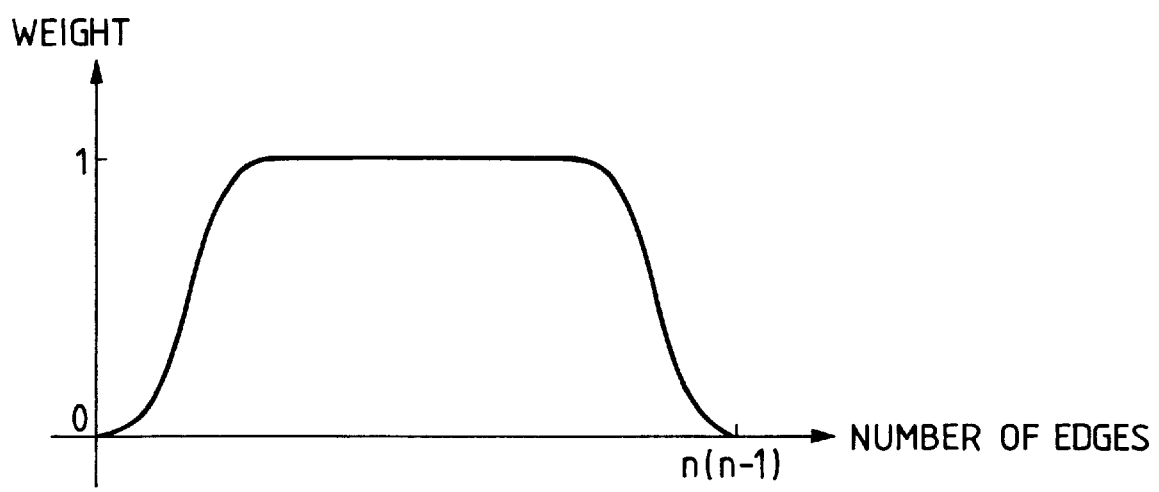
FIG. 4 is a chart showing an example of the evaluation function.

FIG. 4 shows an example of the weighting function (evaluating function) for the number of detected edges, wherein n indicates the block size in the x- and y-directions. The maximum number of edges in a block of n x n pixels is n(n−1). When the number of edges is close to zero, the evaluation is low because the effective information for movement vector detection is deficient. On the other hand, the evaluation is also low if the number of edges is very large, because mismatching can happen easily. The operation circuit 44 evaluates the x- and y-components of the detected movement vectors, individually utilizing said weighting function, and effects a process of averaging similar movement vectors with weights in a closed output area and eliminating the movement vectors of low reliability.

In the foregoing embodiment, the edge is judged from a particular spatial frequency component extracted by the two-dimensional BPF 36, but it is naturally possible also to count the edges of boundaries or contours by extracting edge information from multi-value image signal. Direct edge detection from the luminance signal can be achieved by the zero-crossing method, in which the edge is detected by secondary differentiation of the luminance signal, as detailedly reported by D. Marr and E. Hildreth in "Theory of Edge Detection", Proceeding of the Royal Society of London, B207, 1980, pp187–217.

Figure 5A:
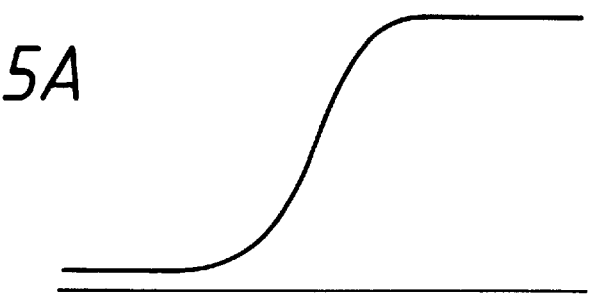
FIGS. 5A to 5C are charts showing the principle of edge detection by the zero crossing method.
Figure 5B:
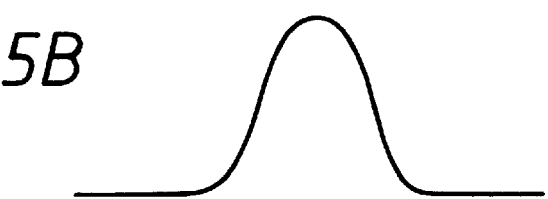
Figure 5C:
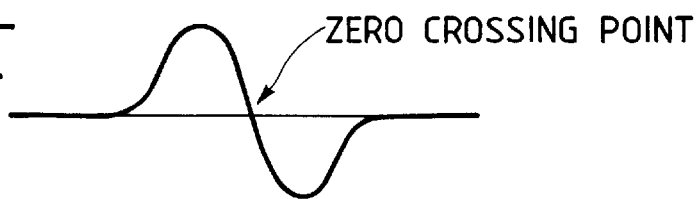

FIG. 5A shows an edge part of an image, while FIG. 5B shows a differential of the signal shown in FIG. 5A, and FIG. 5C shows a differential of the signal shown in FIG. 5B, or a second-order differential of the signal shown in FIG. 5A. The waveform of said second-order differential shown in FIG. 5C inverts the sign at the center of the edge, and said sign inverting point is called zero crossing point. Thus the edges can be detected in the horizontal and vertical directions, by effecting second-order differentiation in said directions. The reliability of the detected movement vector can be evaluated also by the edges detected by such zero crossing method.

There have also been proposed other types of edge detectors, which are likewise applicable to the present invention. For example there are already known Roberts' edge detector reported by L. G. Roberts, "machine perception of three-dimensional solids", in Optical and Electro-optical Information Processing, and J. T. Tippett et al. (eds,), MIT Press, Cambridge, Mass., 1965, pp.159–197, and Prewitt's edge detector reported by J. M. S. Prewitt, "object enhancement and extraction" in Picture Processing and Psychopictorics; and B. S. Lipkine and A. Rosenfeld (eds.), Academic Press, New York, 1970.

In the foregoing embodiment, the reliability of the movement vector is evaluated by the total sum of the number of edges in the x- or y-direction, but the above-mentioned evaluation function may also be applied to a horizontal or vertical scanning line in each block. The meaning of such method will be explained with reference to FIG. 6.

Figure 6A:
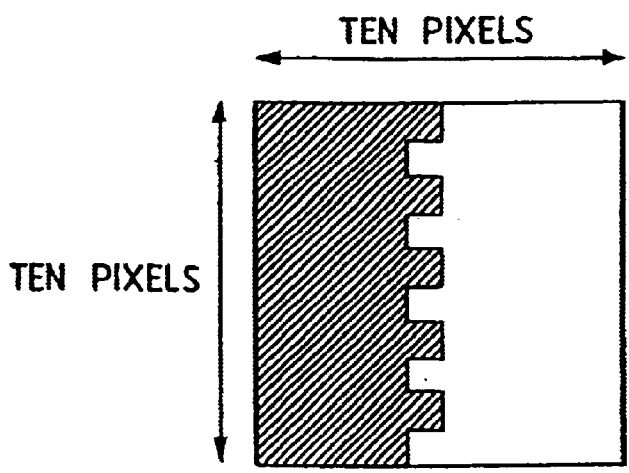
FIGS. 6A, 6B and 6C show a view showing a binary pattern having edges periodically on a vertical line.
Figure 6B:
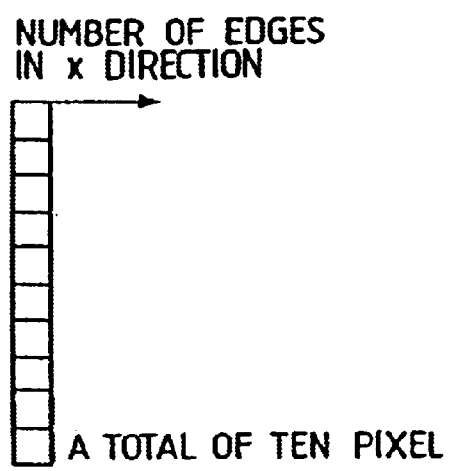
Figure 6C:
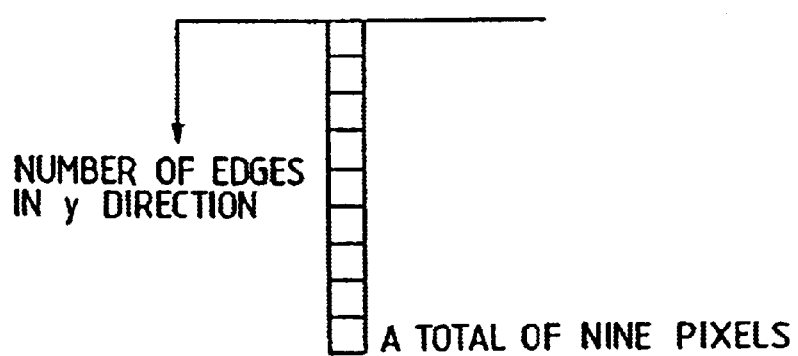

FIG. 6 shows an example of binary pattern, with a block size of 10×10 pixels, and the distributions of the number of edges in the x- and y-direction are shown by histograms illustrated outside of said pattern. The pattern shown in FIG. 6 has edges repeating in the y-direction with a short cycle, so that it is difficult to exactly detect the y-component of the movement vector. However, this pattern has 10 edges in the x-direction and 9 edges in the y-direction, so that the reliability is high in the evaluation by the total sum of the number of edges.

For such pattern, the aforementioned evaluation function may be applied to each horizontal or vertical scanning line. For a block size of n×n pixels, the number of edges present on a horizontal or vertical scanning line is between 0 and (n−1). Therefore, the evaluation (weight) is made lower in case the number of detected edges is 0 or (n−1) or close thereto. With this method, the y-component of the movement vector detected in this block is evaluated low.

As will be easily understood from the forgoing description, the reliability of plural detected movement vector values is evaluated by the numbers of edges detected in respective blocks, so that a movement vector of high reliability and high precision can be obtained in the entire image area or in a suitable closed area. Consequently there can be obtained satisfactory performance in the moving image encoding device or in the image vibration compensating device.

What is claimed is:

1. A movement vector detecting device comprising:
   A) block dividing means for dividing an image frame into plural blocks;
   B) edge detection means for detecting edge information in each of the plural blocks;
   C) movement vector detecting means for detecting change of an image in each of the plural blocks between a plurality of image frames to detect a movement vector for each of the plural blocks between the plurality of image frames independently of and without using the edge information detected by said edge detection means; and
   D) evaluation means for inputting the movement vector outputted from said movement vector detecting means and the edge information outputted from said edge detection means and for evaluating reliability of the inputted movement vector by using the inputted edge information.

2. A movement vector detecting device according to claim 1, wherein said movement vector detecting means includes filter means for extracting frequency components suitable for the detection of said movement vector, and eliminating unnecessary low and high frequency components.

3. A movement vector detecting device according to claim 2, wherein said filter means binarizes a luminance signal, utilizing a predetermined DC level as a threshold value.

4. A movement vector detecting device according to claim 1, wherein said evaluating means is adapted to calculate the movement vector of the entire image frame by weighting the movement vector in each of said blocks by the information on said number of edges.

5. A movement vector detecting device according to claim 1, wherein said evaluation means calculates a movement vector for the entire image frame by weighting the movement vectors of the plural blocks based on the number of edges detected in each of the plural blocks.

6. A movement vector detecting device according to claim 1, further comprising compensation means for compensating for movement of an image, taking into account the reliability of the movement vectors for the plural blocks.

7. A movement vector detecting device according to claim 6, further comprising an image memory for storing the image, wherein said compensation means cancels the movement of the image by shifting the image read-out range of said image memory, based on a movement vector for the entire image frame, which said evaluation means calculates by taking into account the reliability of the movement vectors for the plural blocks.

8. An image pickup device comprising:
   A) image pickup means for effecting photoelectric conversion on an image formed on an image taking plane, thereby outputting an image signal;
   B) block division means for dividing an image frame into plural blocks;
   C) edge detection means for detecting edge information in each of the plural blocks;
   D) movement vector detecting means for detecting change of an image in each of the plural blocks between a plurality of image frames to detect a movement vector for each of the plural blocks independently of and without using the edge information detected by said edge detection means;
   E) operation means for determining a weighted value for the movement vector detected for each of the plural blocks by said movement vector detecting means on the basis of the edge information detected in each of the plural blocks by said edge detection means, and determining a representative movement vector for the image based on the weighted values for the movement vectors of the plural blocks; and
   F) compensation means for cancelling movement of the image, based on a result of the determination of the representative movement vector by said operation means.

9. An image pickup device according to claim 8, wherein said movement vector detecting means includes a band-pass filter for extracting the vibration frequency components of the image, from said image signal.

10. An image pickup device according to claim 9, wherein said edge detecting means is adapted to detect the number of edges in the horizontal and vertical directions in said block, from the image signal transmitted by said band-pass filter.

11. An image pickup device according to claim 8, wherein said operation means determines a higher weighted value for the movement vector of a block or blocks in which the number of edges detected by said edge detection means is within a predetermined range than for the movement vector of a block or blocks in which said number of edges is outside said predetermined range.

12. An image pickup device according to claim 8, further comprising an image memory for storing the image signal, corresponding to the image, released from said image pickup means;
   wherein said compensation means, in reading out image information from said image memory, varies the read-out position from said image memory in a direction to cancel the representative movement vector for the image determined by said operation means.

13. An image pickup device comprising:
   A) image pickup means for effecting photoelectric conversion on an image, formed on an image taking plane, to generate an image signal;
   B) block division means for dividing an image frame into plural blocks;
   C) detection means for detecting feature information in each of the plural blocks;
   D) movement vector detecting means for detecting change of the image in each of the plural blocks between a plurality of image frames to detect a movement vector for each of the plural blocks between the plurality of image frames independently of and without using the feature information detected by said detection means;
   E) operation means for providing a weighted value for the movement vector detected for each of the plural blocks by said movement vector detecting means according to the feature information of each of the plural blocks and performing a predetermined averaging operation, thereby determining a representative movement vector for the image based on the weighted values for the movement vectors for the plural blocks; and
   F) compensation means for cancelling movement of the image, according to the representative movement vector determined by said operation means.

14. An image pickup device according to claim 13, wherein said movement vector detecting means includes filer means for extracting frequency components suitable for the detection of said movement vector and eliminating unnecessary low and high frequency components.

15. An image pickup device according to claim 14, wherein said filter means binary digitizes a luminance signal, using a predetermined DC level as a threshold value.

16. An image pickup device according to claim 15, wherein said operation means counts the number of edges, in each of said blocks, by counting a number of inversions of said binary digitized luminance signal in the vertical and horizontal directions.

17. An image pickup device according to claim 15, wherein said operation means detects an edge in said image signal by second-order differentiation of said image signal, thereby detecting the number of edges in each of said blocks.

18. An image pickup device according to claim 13, further comprising an image memory for storing the image signal, corresponding to the image, generated by said image pickup means;
   wherein said compensation means, in reading out image information from said image memory, varies the read-out position from said image memory in a direction to cancel the representative movement vector for the image determined by said operation means.

19. An image movement correcting device comprising:
   A) block dividing means for dividing an image frame into plural blocks;
   B) detection means for detecting feature information in each of the plural blocks;
   C) movement vector detecting means for detecting change of an image in each of the plural blocks between a plurality of image frames to detect a movement vector for each of the plural blocks between the plurality of image frames independently of and without using the feature information detected by said detection means;
   D) discriminating means for discriminating effective movement vectors indicative of movement of the image caused by a shake, from all of the movement vectors detected for the plural blocks by said movement vector detecting means and calculating a representative movement vector for the image frame based on the effective movement vectors; and
   E) correction means for correcting the movement of the image in the image frame according to the representative movement vector calculated by said discriminating means.

20. A device according to claim 19, wherein said movement vector detecting means includes filter means for extracting frequency components suitable for the detection of said movement vector, and eliminating unnecessary low and high frequency components.

21. A device according to claim 20, wherein said filter means is adapted to binarize a luminance signal from said blocks, utilizing a predetermined DC level as a threshold value.

22. A device according to claim 19, wherein said detecting means detects a number of edges of the image in each of the plural blocks of said image frame.

23. A device according to claim 22, wherein said discriminating means calculates the representative movement vector for the image frame by weighting the movement vector for each of the plural blocks based on said number of edges.

24. A device according to claim 19, wherein said correction means includes an image memory for storing the image and cancels movement of the image by shifting an image read-out range of said image memory based upon the representative movement vector for the image frame, whose reliability is evaluated by said discriminating means.

25. A method of detecting a movement vector and evaluating its reliability, comprising the steps of:
A) dividing an image frame into plural blocks;
B) determining a number of edges of the image detected in each of the plural blocks;
C) detecting change of the image in each of the plural blocks between a plurality of image frames to detect a movement vector for each of the plural blocks independently of and without using the number of edges determined in said determining step; and
D) inputting the movement vector outputted in said movement vector detecting step and the number of edges outputted in said determining step and evaluating the reliability of the movement vector detected for each of the plural blocks by using the number of edges in each of the plural blocks.

26. A method according to claim 25, wherein said detecting step includes extracting frequency components suitable for the detection of the movement vector, and eliminating unnecessary low and high frequency components.

27. A method according to claim 26, wherein said extracting step includes binarizing a luminance signal, utilizing a predetermined DC level as a threshold value.

28. A method according to claim 25, wherein said detecting step includes counting the number of edges in the vertical and horizontal directions in each of the plural blocks.

29. A method according to claim 25, wherein said evaluating step includes calculating the movement vector of an entire image frame by weighting the movement vector for each of the plural blocks based on the number of edges in each of the plural blocks.

30. A method according to claim 25, further comprising a step of compensating for movement of an image, taking into account the reliability of the movement vector for each of the plural blocks.

31. A method according to claim 30, further comprising a step of storing the image in an image memory, and wherein said compensating step includes cancelling the movement of the image by shifting the image read-out range of said image memory, based on a movement vector for the entire image frame, which is calculated in said evaluating step by taking into account the reliability of the movement vector for each of the plural blocks.

32. A method of compensating for movement of an image, comprising the steps of:
A) effecting photoelectric conversion on an image formed on an image taking plane, thereby outputting an image signal;
B) dividing an image frame into plural blocks;
C) counting a number of edges of the image detected in each of the plural blocks;
D) detecting a movement vector for each of the plural blocks by detecting change of the image in each of the plural blocks between a plurality of image frames to detect a movement vector for each of the plural blocks independently of and without using the number of edges detected in said counting step;
E) determining a weighted value to be accorded the movement vector detected for each of the plural blocks on the basis of the number of edges counted in each of the plural blocks, and determining a representative movement vector for the image based on the weighted values for the movement vectors of the plural blocks; and
F) cancelling movement of the image, based on the representative movement vector determined in said determining step.

33. A method according to claim 32, wherein said detecting step includes extracting the vibration frequency components of the image, from the image signal, using a band-pass filter.

34. A method according to claim 33, wherein said counting step includes counting the number of edges in the horizontal and vertical directions in the block, from the image signal transmitted by the band-pass filter.

35. A method according to claim 32, wherein said determining step includes determining a higher weighted value for the movement vector of a block or blocks in which the number of edges detected is within a predetermined range than for the movement vector of a block or blocks in which the number of edges is outside the predetermined range.

36. A method according to claim 32, further comprising a step of storing the image signal in an image memory;
wherein in said cancelling step, in reading out image information from the image memory, the read-out position from the image memory is varied in a direction to cancel the representative movement vector for the image frame.

* * * * *

UNITED STATES PATENT AND TRADEMARK OFFICE
CERTIFICATE OF CORRECTION

PATENT NO. : 6,741,652 B1
DATED : May 25, 2004
INVENTOR(S) : Toshiaki Kondo et al.

It is certified that error appears in the above-identified patent and that said Letters Patent is hereby corrected as shown below:

Title page,
Item [63], Related U.S. Application Data, '08/018,514", should read -- 08/018,504 --.

Column 1,
Line 4, "08/018,514" should read -- 08/018,504 --.

Column 6,
Line 51, "evaluating" should read -- evaluation --.
Line 67, "the" (second occurrence) should read -- an --.

Column 7,
Line 34, "the" should be deleted.
Line 37, "detecting" should read -- detection --.
Line 38, "said" should read -- a --.
Line 52, "the" should read -- a --.

Column 8,
Line 18, "filer" should read -- filter --.
Lines 25 and 38, "the" should read -- a --.

Column 9,
Line 7, "detecting" should read -- detection --.

Column 10,
Line 4, "the" (second occurrence) should read -- an --.
Line 35, "the" should be deleted.

Signed and Sealed this

Seventeenth Day of May, 2005

JON W. DUDAS
*Director of the United States Patent and Trademark Office*